(12) United States Patent
Makida

(10) Patent No.: US 9,195,591 B2
(45) Date of Patent: Nov. 24, 2015

(54) MEMORY SYSTEM

(71) Applicant: KABUSHIKI KAISHA TOSHIBA, Minato-ku (JP)

(72) Inventor: Hisaki Makida, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 277 days.

(21) Appl. No.: 14/022,730

(22) Filed: Sep. 10, 2013

(65) Prior Publication Data

US 2014/0365711 A1    Dec. 11, 2014

Related U.S. Application Data

(60) Provisional application No. 61/833,164, filed on Jun. 10, 2013.

(51) Int. Cl.
*G06F 12/02* (2006.01)
*G06F 12/10* (2006.01)

(52) U.S. Cl.
CPC ........ *G06F 12/0246* (2013.01); *G06F 12/0253* (2013.01); *G06F 12/1009* (2013.01); *G06F 2212/7201* (2013.01)

(58) Field of Classification Search
None
See application file for complete search history.

(56) References Cited

FOREIGN PATENT DOCUMENTS

| | | |
|---|---|---|
| JP | 2008-146255 | 6/2008 |
| JP | 2009-301264 | 12/2009 |
| JP | 2012-68764 | 4/2012 |

*Primary Examiner* — Kevin Verbrugge
(74) *Attorney, Agent, or Firm* — Oblon, McClelland, Maier & Neustadt, L.L.P.

(57) ABSTRACT

According to one embodiment, a memory system includes a nonvolatile memory, a storage unit, and a comparison unit. The nonvolatile memory stores an address translation table recording a first address and a second address corresponding to the first address and a write data. The storage unit stores a list and the address translation table. The list stores a third address. The address translation table is loaded from the nonvolatile memory in response to an access request to the nonvolatile memory. The address translation table includes the first address as a target of the access request. The comparison unit compares the third address stored in the list and the second address recorded in the address translation table and outputs a comparison result.

20 Claims, 4 Drawing Sheets

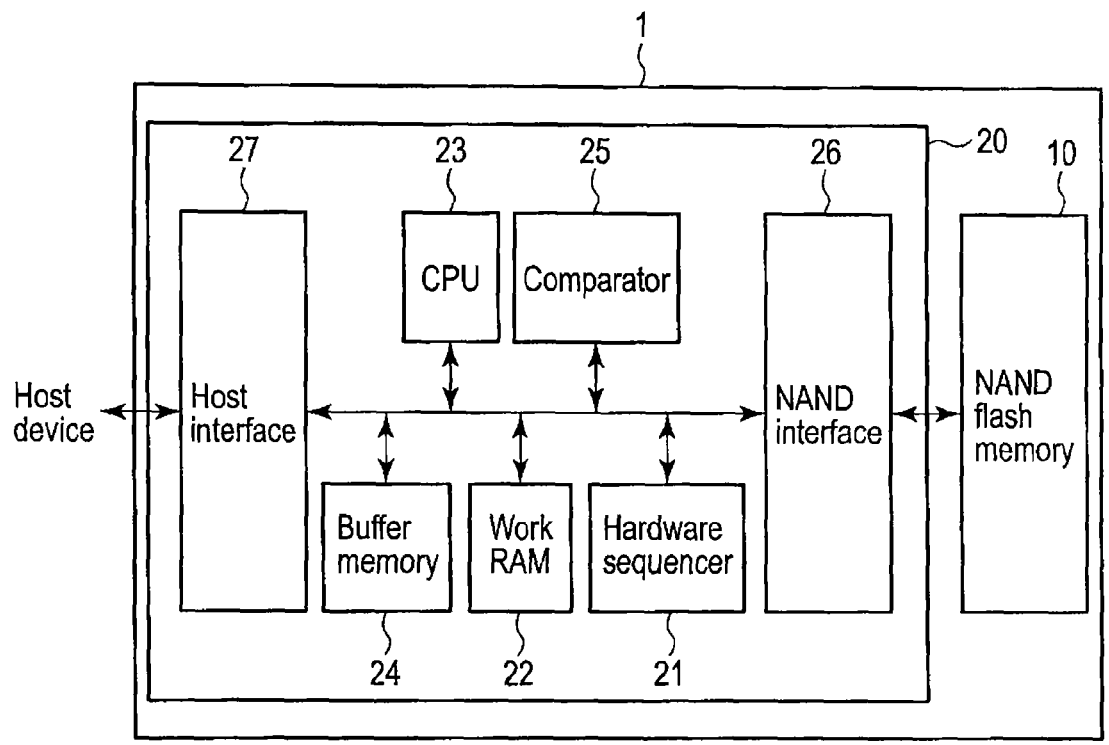
F I G. 1
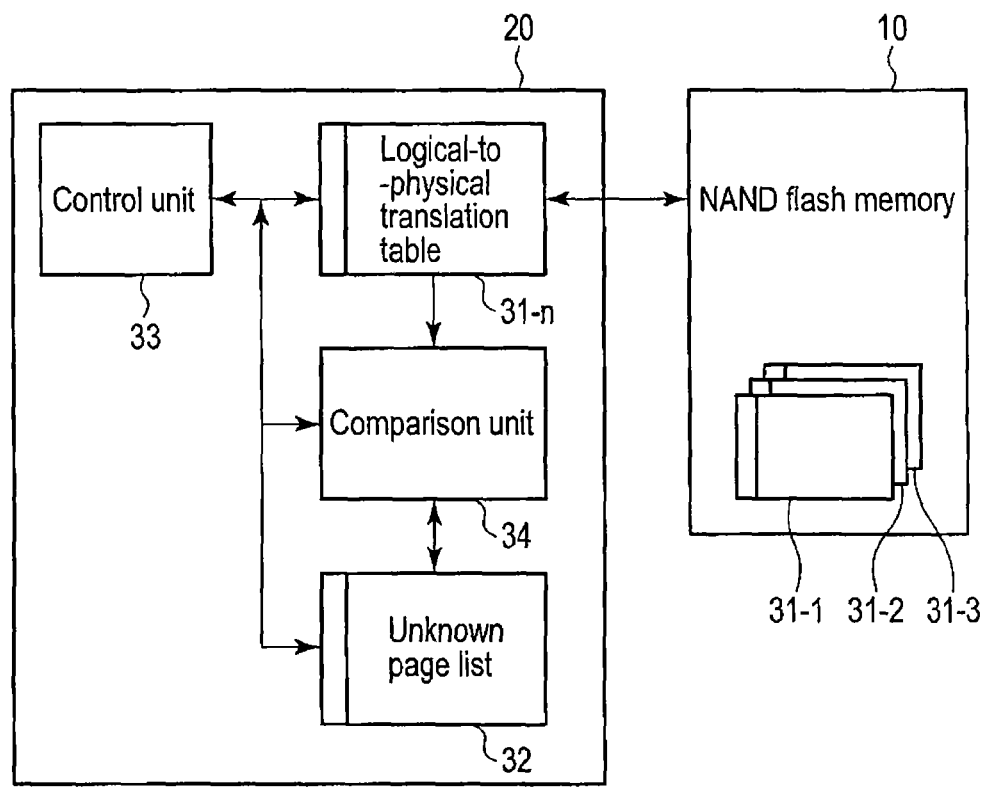
F I G. 2

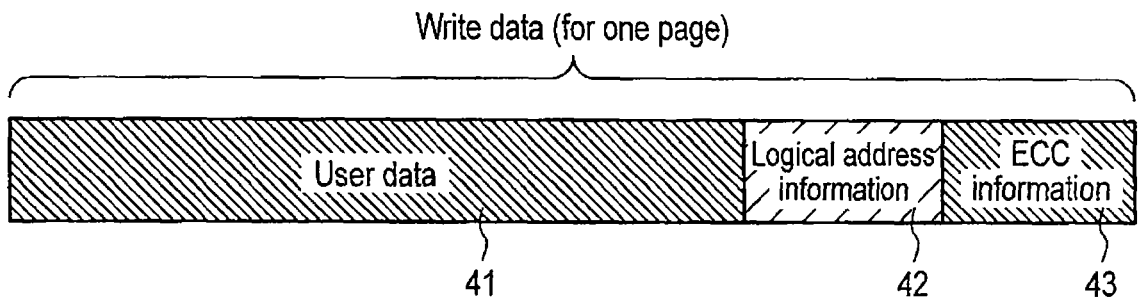
FIG. 3
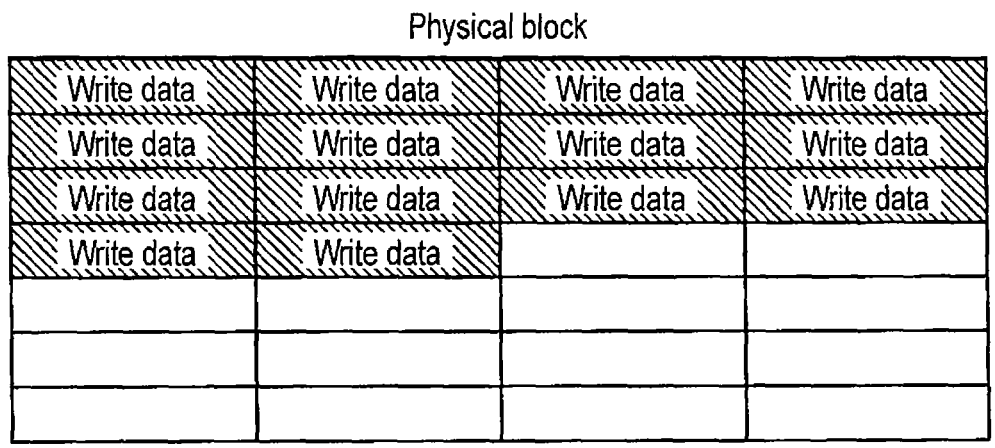
FIG. 4
| No. | Logical page address | Physical page address of storage location |
|---|---|---|
| 0 | 0 | Block(0x11), Page(0x30) |
| 1 | 1 | Block(0x30), Page(0x50) |
| 2 | 2 | Block(0x06), Page(0x12) |
| 3 | 3 | Block(0x24), Page(0x00) |
| ⋮ | ⋮ | ⋮ |
FIG. 5

| No. | Unknown page | Resolution information |
|---|---|---|
| 0 | Physical page address | Resolved logical address |
| 1 | Physical page address | Unresolved |
| 2 | Physical page address | Unresolved |
| 3 | Physical page address | Resolved logical address |
| ⋮ | ⋮ | ⋮ |

32

F I G. 7

MEMORY SYSTEM

CROSS-REFERENCE TO RELATED APPLICATIONS

This application claims the benefit of U.S. Provisional Application No. 61/833,164, filed Jun. 10, 2013, the entire contents of which are incorporated herein by reference.

FIELD

Embodiments described herein relate generally to a memory system containing a nonvolatile memory.

BACKGROUND

In a conventional memory system, for example, a memory system containing a NAND flash memory, the logical-physical address translation that translates a logical address into a physical address is managed in blocks as an erase unit of the NAND flash memory.

However, when the address translation is managed in blocks, the management unit is the block and thus, it is necessary to access the whole block even if a read/write (hereinafter, a random read/write) of data of a size smaller than the block size is done. Therefore, it is difficult to increase a random read/write speed.

If the block is divided into smaller sizes (pages) for management, by contrast, the random read/write speed can be increased because only the relevant page needs to be accessed.

When the address translation is managed in pages, data in the block is split into pages and thus, it becomes necessary to always secure free blocks by rearranging data by garbage collection. The garbage collection is a function that rearranges data arranged by being distributed in a plurality of blocks in some block to release a block in which only unnecessary data remains.

However, if data in the block intended for garbage collection is damaged for some reason and cannot be read, the garbage collection fails and the block cannot be released. As a result, the block is used up and the system fails.

BRIEF DESCRIPTION OF THE DRAWING

FIG. 1 is a block diagram showing a hardware configuration of a memory system according to an embodiment;

FIG. 2 is a block diagram showing a functional configuration of a NAND controller in the embodiment;

FIG. 3 is a diagram showing a data configuration of write data for one page;

FIG. 4 is a diagram showing a write example into a physical block in a NAND flash memory;

FIG. 5 is a diagram showing a logical-to-physical translation table;

FIG. 7 is a diagram showing an example of an unknown page list.

DETAILED DESCRIPTION

Figure 6:
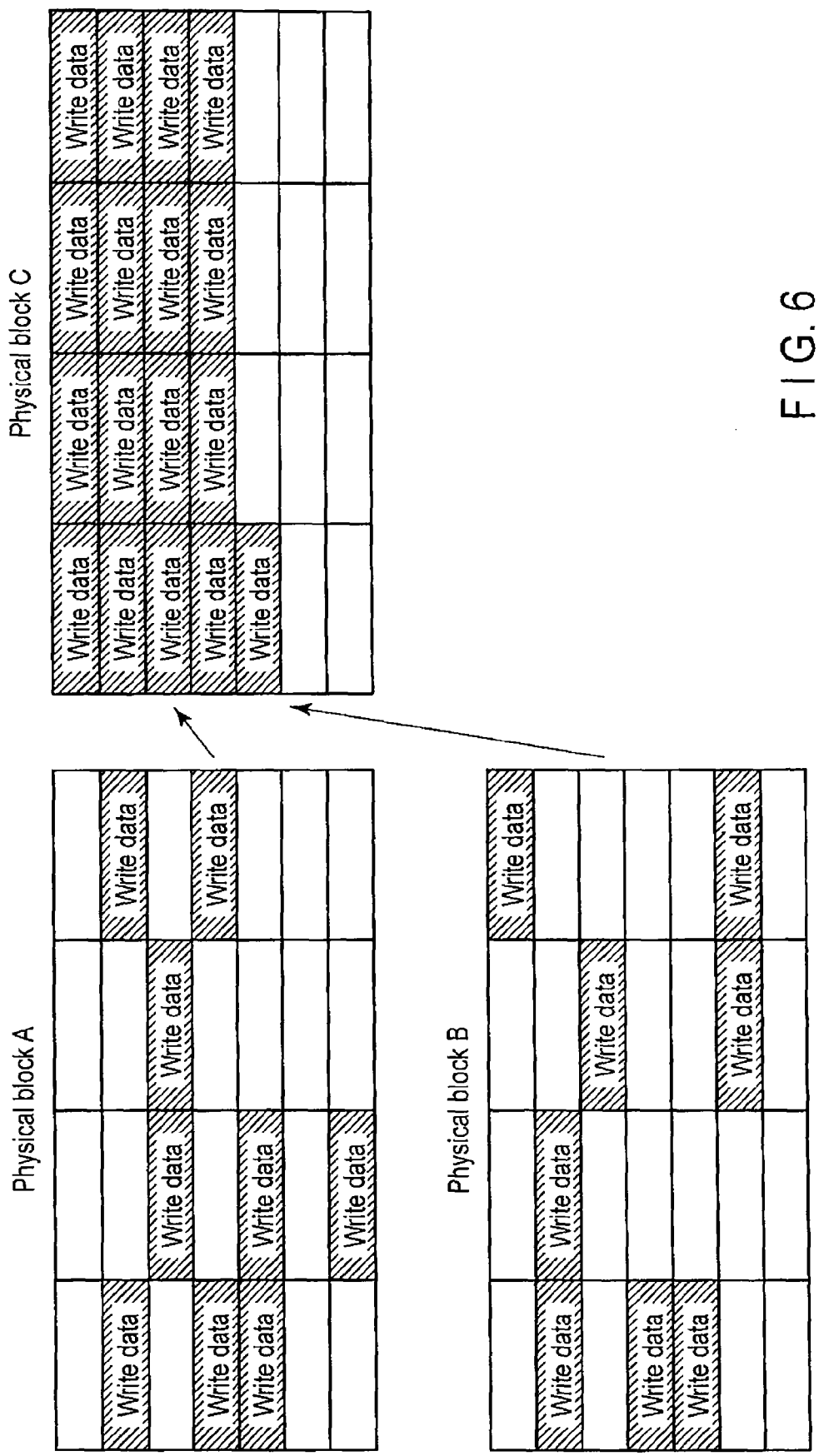
FIG. 6 is a diagram showing an execution example of garbage collection.

A memory system according to an embodiment will be described below with reference to the drawings. Here, as a memory system, a memory system including a NAND flash memory is taken as an example. In the description that follows, the same reference numbers are attached to elements having the same function and configuration and a duplicate description will be provided only when necessary.

In general, according to one embodiment, the memory system includes a nonvolatile memory, a storage unit, and a comparison unit. The nonvolatile memory stores an address translation table in which a first address and a second address corresponding to the first address are recorded and write data. The storage unit stores a list in which a third address is stored and the address translation table loaded from the nonvolatile memory in response to an access request to the nonvolatile memory. The address translation table contains the first address as a target of the access request. The comparison unit compares the third address stored in the list and the second address recorded in the address translation table and outputs a comparison result.

FIG. 1 is a block diagram showing a hardware configuration of a memory system according to an embodiment.

As illustrated in FIG. 1, a memory system 1 includes a NAND flash memory 10 and a NAND controller 20.

The NAND flash memory (hereinafter, NAND memory) 10 is a nonvolatile semiconductor memory. The NAND memory 10 has a plurality of blocks as the erase unit. Each block has a plurality of pages. Each page has a plurality of memory cells. Each memory cell is made of a nonvolatile memory cell transistor containing a floating gate electrode and a control gate electrode. The page is the unit of writing and reading and also the translation unit of addresses.

The NAND controller 20 controls the operation of the NAND memory 10. Here, a case when the NAND memory 10 is configured by one semiconductor chip will be described, but the NAND memory may also be configured by a plurality of semiconductor chips. Also when the NAND memory 10 is configured by the plurality of semiconductor chips, these semiconductor chips are controlled by the one NAND controller 20.

The NAND controller 20 includes a hardware sequencer 21, a work RAM (random access memory) 22, a central processing unit (CPU) 23, a buffer memory 24, a comparator 25, a NAND interface 26, and a host interface 27.

Firmware as a control program of the NAND controller 20 is recorded in, for example, the NAND memory 10 and read into the work RAM 22 by the hardware sequencer 21. The hardware sequencer 21 exercises sequence control of reading/writing the firmware.

The CPU 23 controls write, read, and erase operations with respect to the NAND controller 20 based on the firmware. The work RAM 22 (storage unit) is used as a work area of the CPU 23 and is a volatile memory that stores the control program and various tables.

The buffer memory 24 is a storage area that temporarily stores data during writing or reading. The comparator 25 compares data stored in the work RAM 22 or the like and outputs a comparison result.

The NAND interface 26 performs interface processing between the NAND controller 20 and the NAND memory 10. That is, the NAND interface transmits/receives a signal to/from the NAND memory 10.

The host interface 27 performs interface processing between the NAND controller 20 and a host device. That is, the host interface transmits/receives a signal to/from the host device. More specifically, when the host device writes user data into the memory system 1, the host interface receives the user data and a logical address corresponding to the user data from the host device. When the host device reads user data from the memory system 1, the host interface receives a logical address from the host device and transmits user data corresponding to the logical address. Thus, the host interface receives the logical address to be accessed from the host device.

FIG. 2 is a block diagram showing a functional configuration of the NAND memory 10 and the NAND controller 20 in the embodiment.

The NAND memory 10 stores user data and the like and also stores a plurality of logical-to-physical translation tables. A plurality of logical-to-physical translation tables is provided for a predetermined number of logical page addresses and is managed in units of tables. Logical-to-physical translation tables 31-$n$ ($n$=1, 2, 3) are shown here, but actually still more tables are stored in the NAND memory 10.

For example, each of logical-to-physical translation tables 31-1, 31-2, 31-3 has the capacity of 1 KB. In logical-to-physical translation table 31-1, logical page addresses 0 to 255 and physical page addresses corresponding thereto respectively are recorded. Similarly, in logical-to-physical translation table 31-2, logical page addresses 256 to 511 and physical page addresses corresponding thereto respectively are recorded. In logical-to-physical translation table 31-3, logical page addresses 512 to 767 and physical page addresses corresponding thereto respectively are recorded.

The NAND controller 20 has logical-to-physical translation table 31-$n$ read from the NAND memory 10, an unknown page list 32, a control unit 33, and a comparison unit 34. The control unit 33 corresponds to the CPU 23 in FIG. 1. The comparison unit 34 corresponds to the comparator 25 in FIG. 1.

Logical-to-physical translation table 31-$n$ is loaded from the NAND memory 10 and stored in the work RAM 22. The unknown page list 32 is stored in the work RAM 22. The unknown page list 32 stores physical page addresses whose corresponding logical page addresses are unknown in write data stored in storage locations of the NAND memory 10 specified by the physical page addresses. That a logical page address is unknown indicates that logical address information contained in write data cannot be read.

The comparison unit 34 compares a first physical page address stored in the unknown page list 32 and a second physical page address recorded in logical-to-physical translation table 31-$n$ and outputs a comparison result to the unknown page list 32 or the control unit 33.

The comparison unit 34 may have a function to record the logical page address corresponding to the second physical page address in the unknown page list 32 by associating with the first physical page address when the first physical page address and the second physical page address match.

The control unit 33 controls access requests to the NAND memory 10. The control unit 33 makes an access request based on a logical page address as the target of the access request. The access request is one of for example, reading, writing, and erasing. Erasing here is nullifying a logical page address to erase the logical page thereof. The control unit 33 controls loading of logical-to-physical translation table 31-$n$ into the work RAM 22, recording of the unknown page list 32 into the work RAM 22, and the operation of the comparison unit 34.

The control unit 33 may have a function to record the logical page address corresponding to the second physical page address in the unknown page list 32 by associating with the first physical page address when, after receiving a comparison result from the comparison unit 34, the first physical page address and the second physical page address match.

The operation of the memory system 1 in the embodiment will be described below. According to the embodiment, the address translation is managed in pages and even if a read error of write data stored in a page within a block occurs, the block containing the page can be restored. That is, even if a logical page address recorded in a write data within a block cannot be read, the block containing the page can be erased and released.

FIG. 3 shows write data for one page.

When the address translation is managed in pages, user data is stored in a page within a block of the NAND memory 10 in the data configuration as shown in FIG. 3. Write data includes user data 41, logical address information 42, and error checking and correction (ECC) information 43.

The user data 41 is data used by a user. The logical address information 42 is a logical page address corresponding to the user data 41. Further, the ECC information 43 is information to correct errors that occur in the user data 41 or the logical address information 42.

FIG. 4 shows a write example of write data into a physical block in the NAND memory 10, that is, how write data is stored in a physical block. Write data for one page is stored, as shown in FIG. 4, within a physical block of the NAND memory 10.

The relationship between the logical page of write data and the physical page within a block where the write data is actually stored is represented by logical-to-physical translation table 31-$n$ shown in FIG. 5. In logical-to-physical translation table 31-$n$, the logical page address of write data and the physical page address of the storage location in the NAND memory 10 corresponding to the logical page address are recorded. For example, the physical page address corresponding to logical page address 0 is Block (0x11), Page (0x30). The physical page address corresponding to logical page address 1 is Block (0x30), Page (0x50). Each address is shown in the parentheses.

As described above, logical-to-physical translation table 31-$n$ is generally stored in the NAND memory 10. As shown in FIG. 2, the logical-to-physical translation table here is configured by a plurality of tables 31-1, 31-2, 31-3.

When data stored in the NAND memory 10 is accessed, the control unit 33 transfers logical-to-physical translation table 31-$n$ containing the logical page address to be accessed from the NAND memory 10 to the work RAM 22.

Further, the control unit 33 refers to logical-to-physical translation table 31-$n$ transferred to the work RAM 22 to translate the logical page address into a physical page address. Then, the control unit 33 access the storage location in the NAND memory 10 specified by the determined physical page address.

The NAND memory 10 can only write additional data in physical pages and cannot rewrite data into the same physical page. Thus, when the same logical page address is overwritten, new data is written to a new physical page that is different from the physical page where old data to be rewritten is stored. Then, the logical-to-physical translation table is updated and the logical page address associated with the physical page where old data is stored is associated with the physical page where the new data is stored. As a result, in the logical-to-physical translation table, the physical data where old data is stored no longer corresponds to any logical page address so that the old data is nullified. If the above overwriting is repeated, gaps between valid write data in a block gradually increase.

Thus, like the execution example of garbage collection shown in FIG. 6, it becomes necessary to bring physical blocks A and B back to free blocks by rearranging write data (logical pages) in physical blocks A and B in another physical block C. In FIG. 6, only valid write data is shown as "write data" and physical pages where no data is stored or physical pages where nullified write data is stored remain blank. The garbage collection moves write data remaining in the block and also updates the physical page address of the storage location of the logical-to-physical translation table shown in FIG. 5 to the physical page address of the move destination. Accordingly, the arrangement destination of write data is concentrated in physical block C to release physical blocks A and B. Physical blocks A and B are erased at a predetermined timing.

In the garbage collection, logical address information of write data shown in FIG. 3 may not be readable because of an ECC error or the like. In this case, if write data from which logical address information 42 cannot be read is moved, to which logical page address the write data corresponds becomes unknown. Thus, a page from which the logical address information 42 cannot be read cannot be rearranged. As a result, the page remains in the block and the block cannot be released. Hereinafter, a page where write data from which reading of logical address information failed is stored is denoted as an unknown page.

If such an unknown page that cannot be rearranged appears, the physical page address of the storage location of the logical-to-physical translation table shown in FIG. 5 is searched for to find out the logical page address corresponding to the physical page address of the unknown page. Further, the physical page address corresponding to the logical page address in the logical-to-physical translation table is overwritten with the physical page address of the rearrangement location. In this manner, it is necessary to reduce, that is, resolve unknown pages one by one. According to this method, however, it is necessary to search a large number of logical-to-physical translation tables, leading to an enormous amount of search time.

Thus, in the embodiment, an attempt is made to reduce the time when an unknown page is resolved according to the following steps:

(1) If an unknown page arises when garbage collection is executed, the physical page address of the unknown page is entered in an unknown page list.

FIG. 7 shows an example of the unknown page list. In the unknown page list 32, the physical page address of an unknown page and resolution information corresponding thereto are recorded. If a physical page address is unresolved, information indicating unresolvedness is recorded and if a physical page address is resolved, the logical page address corresponding to the physical page address is recorded.

(2) If an access (read/write/erase) request arrives from the host device, logical-to-physical translation table 31-n containing the logical page address of the access request is loaded from the NAND memory 10 into the work RAM 22 in the NAND controller 20.

Further, physical page addresses in loaded logical-to-physical translation table 31-n are transferred to the comparison unit 34. In parallel therewith, physical page addresses entered in the unknown page list 32 are transferred to the comparison unit 34.

The comparison unit 34 compares the physical page address entered in the unknown page list 32 and the physical page address in logical-to-physical translation table 31-n. In this comparison, all unresolved physical page addresses in the unknown page list 32 and all physical page addresses in logical-to-physical translation table 31-n are successively compared.

For example, a first physical page address whose resolution information is unresolved in the unknown page list 32 and each of physical page addresses in logical-to-physical translation table 31-n are successively compared. Then, a second physical page address whose resolution information is unresolved in the unknown page list 32 and each of physical page addresses in logical-to-physical translation table 31-n are successively compared. That is, when data of logical-to-physical translation table 31-n illustrated in FIG. 5 is transferred from the NAND memory 10 to the work RAM 22, in parallel with the transfer of the data, physical page addresses in the unknown page list 32 and physical page addresses in transferred logical-to-physical translation table 31-n are compared.

Then, if a physical page address in the unknown page list 32 and a physical page address in table 31-n match, the logical page address paired with the physical page address in the table is additionally written to a field (resolution information) corresponding to the physical page address in the unknown page list 32. If no matching occurs, physical page addresses in the unknown page list 32 are assumed not to be entered in logical-to-physical translation table 31-n.

In this manner, all unresolved physical page addresses in the unknown page list 32 and all physical page addresses in logical-to-physical translation table 31-n are compared.

(3) When the garbage collection is executed, resolved physical pages of the unknown page list 32 shown in FIG. 7 are moved to another block end the state of unknown pages.

As described above, in parallel with the transfer of data of logical-to-physical translation table 31-n shown in FIG. 5 from the NAND memory 10 to the work RAM 22, physical page addresses of the unknown page list 32 and logical-to-physical translation table 31-n are compared to find matching physical page addresses so that resolution processing of unknown pages can be performed in the background of normal processing of reading and writing. Accordingly, compared with a case when all logical-to-physical translation tables are searched, the time needed for resolution processing of unknown pages can be reduced.

If the control of the comparison unit 34 is exercised by the hardware sequencer 21 so that the comparison unit 34 compares physical page addresses and makes a notification of matching information to find a logical page address of an unknown page without occupying the CPU 23, the CPU 23 can be allowed to perform other processing in the meantime.

Hereinafter, effects of the embodiment are listed.

A specific address can be detected during transfer of an address translation table from a NAND flash memory to a work RAM by comparing an unknown page list stored in the work RAM and the transferred address translation table. In other words, by comparing data stored in the work RAM and transferred data during data transfer from the NAND flash memory to the work RAM, specific data can be detected so that the time needed to search the table can be reduced.

By comparing an unknown page list and the address translation table to detect matching physical addresses, logical addresses of the unknown page list can be detected without searching all tables.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory that stores an address translation table in which a first address and a second address corresponding to the first address are recorded and write data;
a storage unit that stores a list in which a third address is stored and the address translation table loaded from the nonvolatile memory in response to an access request to the nonvolatile memory, wherein the address translation table contains the first address as a target of the access request; and
a comparison unit that compares the third address stored in the list and the second address recorded in the address translation table and outputs a comparison result.

2. The memory system according to claim 1, wherein if the third address and the second address match, the comparison unit records the first address corresponding to the second address in the list by associating with the third address.

3. The memory system according to claim 1, further comprising:
a control unit that controls the access request, wherein the control unit executes the access request based on the first address as the target of the access request.

4. The memory system according to claim 3, wherein if the comparison result indicates that the third address and the second address match, the control unit records the first address corresponding to the second address in the list by associating with the third address.

5. The memory system according to claim 1, wherein the first, second, and third addresses contain a page address specifying a page.

6. The memory system according to claim 1, wherein the write data contains user data and logical address information and the third address stored in the list is a physical address in the write data where the logical address information cannot be read.

7. The memory system according to claim 1, wherein the write data contains user data, logical address information, and correction information and the correction information is information that corrects an error that occurs in at least one of the user data and the logical address information.

8. The memory system according to claim 1, wherein the address translation table is used to translate the first address into the second address.

9. The memory system according to claim 1, wherein the access request contains at least one of reading, writing, and erasing.

10. The memory system according to claim 1, wherein the comparison unit includes a comparator.

11. The memory system according to claim 1, wherein the nonvolatile memory includes a NAND flash memory.

12. A memory system comprising:
a nonvolatile memory that stores a logical-to-physical translation table in which a logical address and a physical address corresponding to the logical address are recorded and write data, the write data being stored in a storage location of the nonvolatile memory specified by the physical address;
a storage unit that stores an unknown list in which the physical address of which correspondence to the logical address is unknown is stored and a first logical-to-physical translation table loaded from the logical-to-physical translation table in the nonvolatile memory in response to an access request to the nonvolatile memory, wherein the first logical-to-physical translation table contains the logical address as a target of the access request; and
a comparison unit that compares a first physical address stored in the unknown list and a second physical address stored in the first logical-to-physical translation table and outputs a comparison result.

13. The memory system according to claim 12, wherein if the first physical address and the second physical address match, the comparison unit records a first logical address corresponding to the second physical address in the unknown list by associating with the first physical address.

14. The memory system according to claim 12, further comprising:
a control unit that controls the access request, wherein the control unit executes the access request based on the logical address as the target of the access request.

15. The memory system according to claim 14, wherein if the comparison result indicates that the first physical address and the second physical address match, the control unit records a first logical address corresponding to the second physical address in the unknown list by associating with the first physical address.

16. The memory system according to claim 15, wherein the control unit moves the write data inside the nonvolatile memory and during execution of garbage collection that rewrites a third physical address of the write data to a fourth physical address,
detects a second logical address corresponding to the third physical address of the moved write data from the unknown list and records the second logical address in the logical-to-physical translation table by associating with the fourth physical address.

17. The memory system according to claim 12, wherein the logical address and the physical address contain a page address specifying a page.

18. The memory system according to claim 12, wherein the write data contains user data and logical address information and the physical address stored in the unknown list is a physical address in the write data where the logical address information cannot be read.

19. The memory system according to claim 12, wherein the write data contains user data, logical address information, and correction information and the correction information is information that corrects an error that occurs in at least one of the user data and the logical address information.

20. The memory system according to claim 12, wherein the access request contains at least one of reading, writing, and erasing.

* * * * *